United States Patent [19]

Cohen

[11] 4,449,167
[45] May 15, 1984

[54] ADJUSTABLE VEHICLE SAFETY LIGHT

[76] Inventor: Robert Cohen, 80-40 Lefferts Blvd., Kew Gardens, N.Y. 11415

[21] Appl. No.: 501,147

[22] Filed: Jun. 6, 1983

[51] Int. Cl.³ .............................................. F21V 21/26
[52] U.S. Cl. ..................................... 362/269; 362/61; 362/80; 362/285; 362/295; 362/311; 362/362; 362/375; 362/800; 362/802; 362/812
[58] Field of Search .................... 362/61, 80, 269, 285, 362/295, 311, 362, 375, 800, 802, 812

[56] References Cited

U.S. PATENT DOCUMENTS 1,543,168  6/1925  Larose ................................. 362/812

Primary Examiner—Stephen J. Lechert, Jr.
Attorney, Agent, or Firm—Arnold Grant

[57] ABSTRACT

The object of the present invention is an auxiliary safety rear light assembly for vehicles which can be adhesively mounted at any position on the rear window of a car or truck.

Another object of the present invention is an auxiliary safety rear light assembly which can be adjusted along a horizontal axis so as to be mountable parallel to the road regardless of the angle which the vehicle rear window makes to the road.

Still another object of the present invention is an auxiliary safety rear light assembly for vehicles comprising a lightable area which will illuminate in response to and signal vehicle actions, pivot means on either end of the lightable area to pivot the lightable area on its horizontal axis, a mounting bracket having two dependent sides and a foot perpendicular to each of such sides, each side having means to accept a lightable area pivot means and locking means to lock the pivot means and hold the lightable area in a desired position relative to such sides, and each foot having adhesive means on a surface thereof to fixedly attach the auxiliary safety rear light assembly to the vehicle.

3 Claims, 3 Drawing Figures

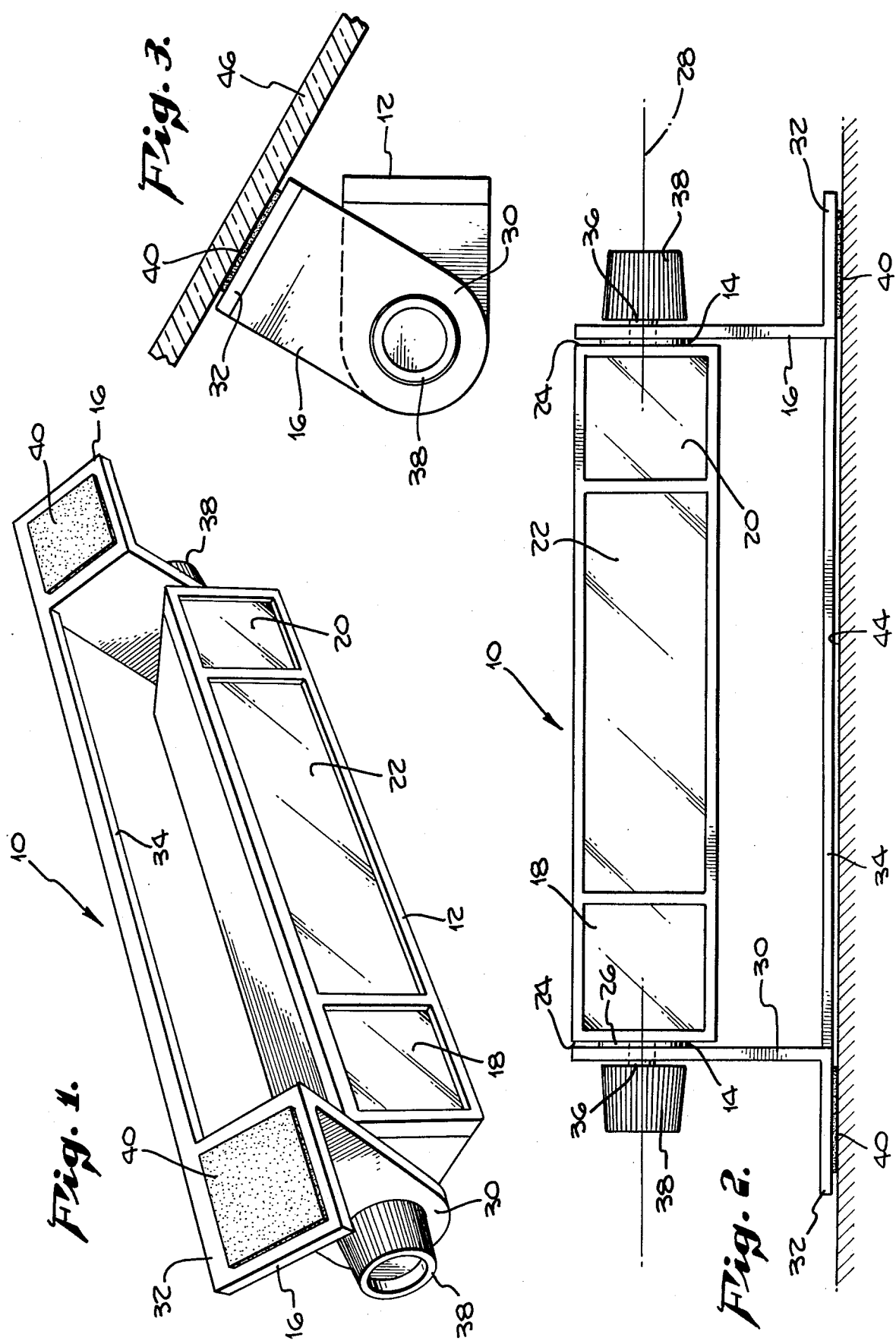

ADJUSTABLE VEHICLE SAFETY LIGHT

BACKGROUND OF THE INVENTION

The present invention relates to a vehicle safety rear light. More particularly, the present invention relates to an auxiliary safety rear light assembly which can be adjustably attached to the rear window of an automobile or truck.

Every year more than three million rear-end auto collisions cause damage, injury or death. A study by the National Highway Traffic Safety Administration has determined that a supplementary rear light mounted at the center of the trunk lid or rear hatch at driver's eye level had a dramatic effect on the accident rate. Cars equipped with the extra light had half as many rear-end collisions as cars with conventional brake lights. Moreover, in the collisions that did occur, the damage cost less than half as much to repair.

While the desireability of supplementary rear lights is clearly recognized it is surprising that they are not more readily available in the vehicle after-market. The principle reason for this is believed to be the great variety of designs for trunk lids and rear hatches in vehicles produced over the past ten years. Optimally, the supplementary rear light will be positioned so that it is parallel to the road. Also optimally the light will be positioned at driver eye level.

Because there are so many different attitudes and angles of vehicle trunk lids and rear hatches and the relative position on the rear of the vehicle, which aligns with driver's eye level in the majority of trailing vehicles, varies from vehicle to vehicle no single supplementary rear light design has heretofore been usable on more than one or two types of vehicles. Manufacturers may thus be reluctant to enter such a fragmented marketplace and be forced to make a different supplementary rear light for each model and year of vehicle.

A need thus exists for an auxiliary safety rear light assembly which can be universally adapted to the wide variety of existing vehicles.

DESCRIPTION OF THE DRAWINGS

FIG. 1 is a perspective view showing the auxiliary safety rear light assembly for vehicles according to the present invention;

FIG. 2 is a front view showing the auxiliary safety rear light assembly for vehicles attached to a horizontal vehicle surface such as a rear shelf; and, FIG. 3 is a side view showing the auxiliary safety rear light assembly for vehicles attached to the rear window of a vehicle.

DETAILED DESCRIPTION OF THE INVENTION

Turning now to FIGS. 1 through 3 the auxiliary safety rear light assembly for vehicles 10 comprises a lightable area 12, pivot means 14, and a mounting bracket 16.

Lightable area 12 may assume any of several embodiments, all of which are within the scope of the present invention. It may, for example, only have a stop signal which is activated and illuminated in response to the driver depressing the vehicle brake pedal. Alternatively, it may, as shown, have a designated area 18 to indicate the vehicle is turning left, a designated area 20 to indicate the vehicle is turning right, and a designated area 22 to indicate the vehicle brake pedal is being depressed and the vehicle is slowing down. Also alternatively it might flash a message or a warning such as "stop" or "turning", etc.

The lightable area 12 is electrically connected to the vehicle by wires and circuitry (not shown) which are well known and understood by those skilled in the art. The lightable area may be illuminated, in response to the driver's actions or desires, by means as simple as a light bulb or as complex as an LED readout. Since such illumination means do not form a part of the present invention and are well understood by those skilled in the art, they will not be described herein. The lightable area is shown for convenience as having a rectangular cross-section, although it may be in any shape or configuration.

The lightable area has pivot means 14 on each opposing and surface 24. The pivot means, shown here by way of example as dowels 26 with threaded ends (not shown), permit the lightable area to be pivoted on its horizontal axis 28.

Mounting bracket 16 comprises two dependent sides 30, a foot 32 perpendicular to each of dependent sides, and a connection bar 34 intermediate each foot 32. The dependent sides 30 have means, such as openings 36 to accept and position the dowels 26 of the lightable area pivot means 14. The dependent sides 30 also have locking means 38, shown illustratively as knobs with internal threads to tighten down on the threaded ends of the dowel 26 of the pivot means 14 and thus lock the lightable area 12 into any desired position relative to the mounting bracket 16. Each foot 32 has adhesive means 40, such as a pressure sensitive double-backed adhesive, to fixedly attach the auxiliary safety rear light assembly to the vehicle.

In operation, the auxiliary safety rear light assembly is attached to the vehicle, optimally at driver's eye level, by applying appropriate pressure to the pressure sensitive double-backed adhesive and making the necessary electrical connections (not shown). The relative angle of the lightable area to the dependent sides 30 of the mounting bracket is then adjusted, so that the lightable area is perpendicular to the ground. Finally, the locking means 38 are engaged to fix and hold that relative position. FIG. 2 shows the auxiliary safety rear light assembly attached to the rear shelf 44 of a vehicle; and, FIG. 3 shows the auxiliary safety rear assembly attached to the rear window 46 of a vehicle.

As this invention may be embodied in several forms without departing from the spirit or intent thereof, the present invention is intended to be defined by the following claims rather than by the preceding description.

I claim:

1. An auxiliary safety rear light assembly for vehicles comprising a lightable area which will illuminate in response to and signal vehicle action, pivot means on either end of the lightable area to pivot the lightable area on its horizontal axis, a mounting bracket having two dependent sides and a foot perpendicular to each of such sides, each side having means to accept a lightable area pivot means and locking means to lock the pivot means and hold the lightable area in a any desired position relative to such sides, and each foot having adhesive means on a surface thereof to fixedly attach the auxiliary safety rear light assembly to the vehicle.

2. An auxiliary safety rear light assembly for vehicles as defined in claim 1 wherein the pivot means has screw threads thereon and the dependent sides of the mounting brackets each have an opening therein, the threaded end of the pivot means extending into and through the openings.

3. An auxiliary safety rear light assembly for vehicles as defined in claim 2 wherein the locking means has an internal thread which screws onto the threaded end of the pivot means.

* * * * *